July 30, 1963
G. N. CHATHAM ET AL
3,099,290
DIVERTING VALVE
Filed Jan. 31, 1961
3 Sheets-Sheet 1
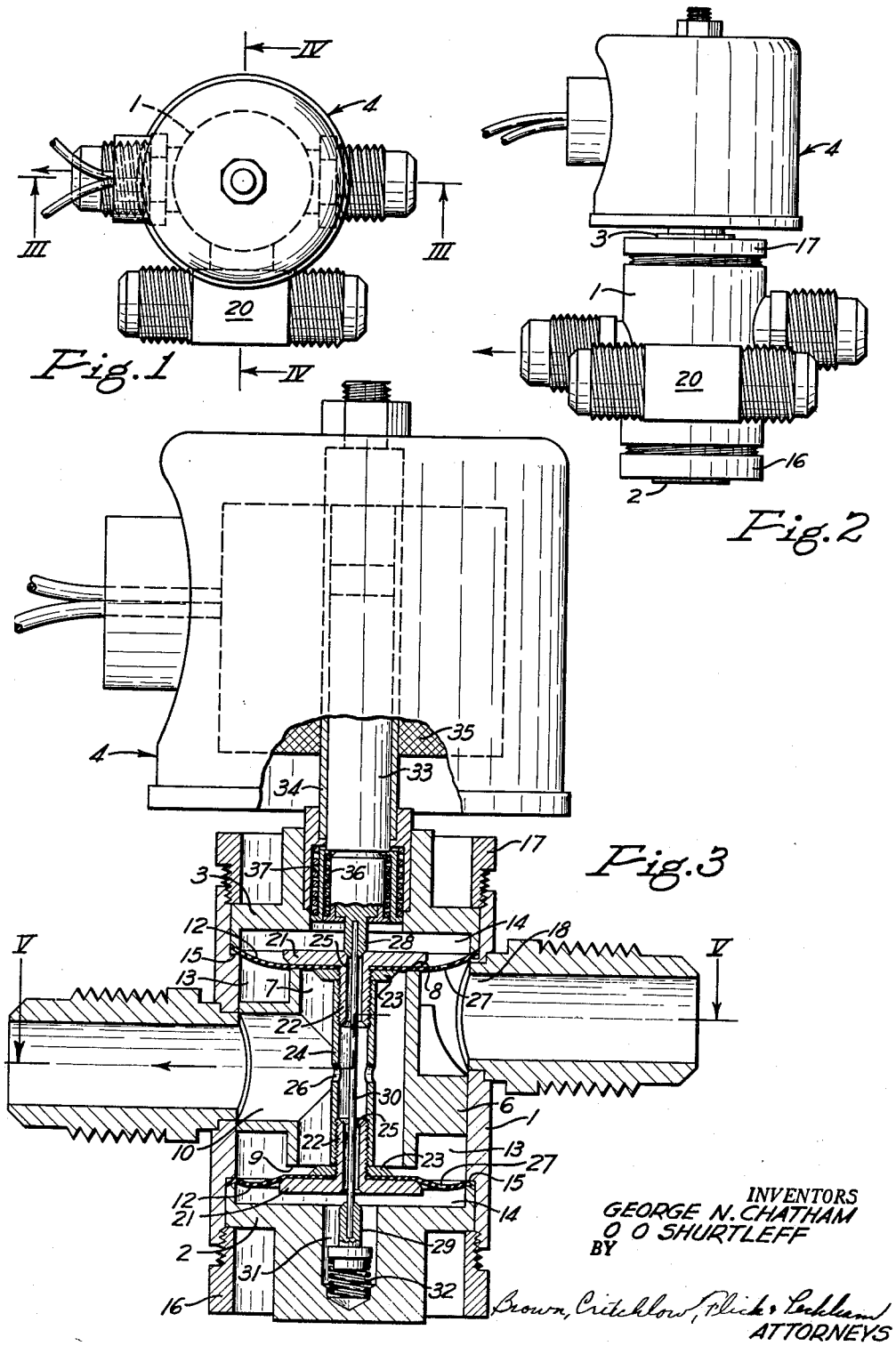
INVENTORS
GEORGE N. CHATHAM
O. O. SHURTLEFF
BY
Brown, Critchlow, Flick & Peckham
ATTORNEYS

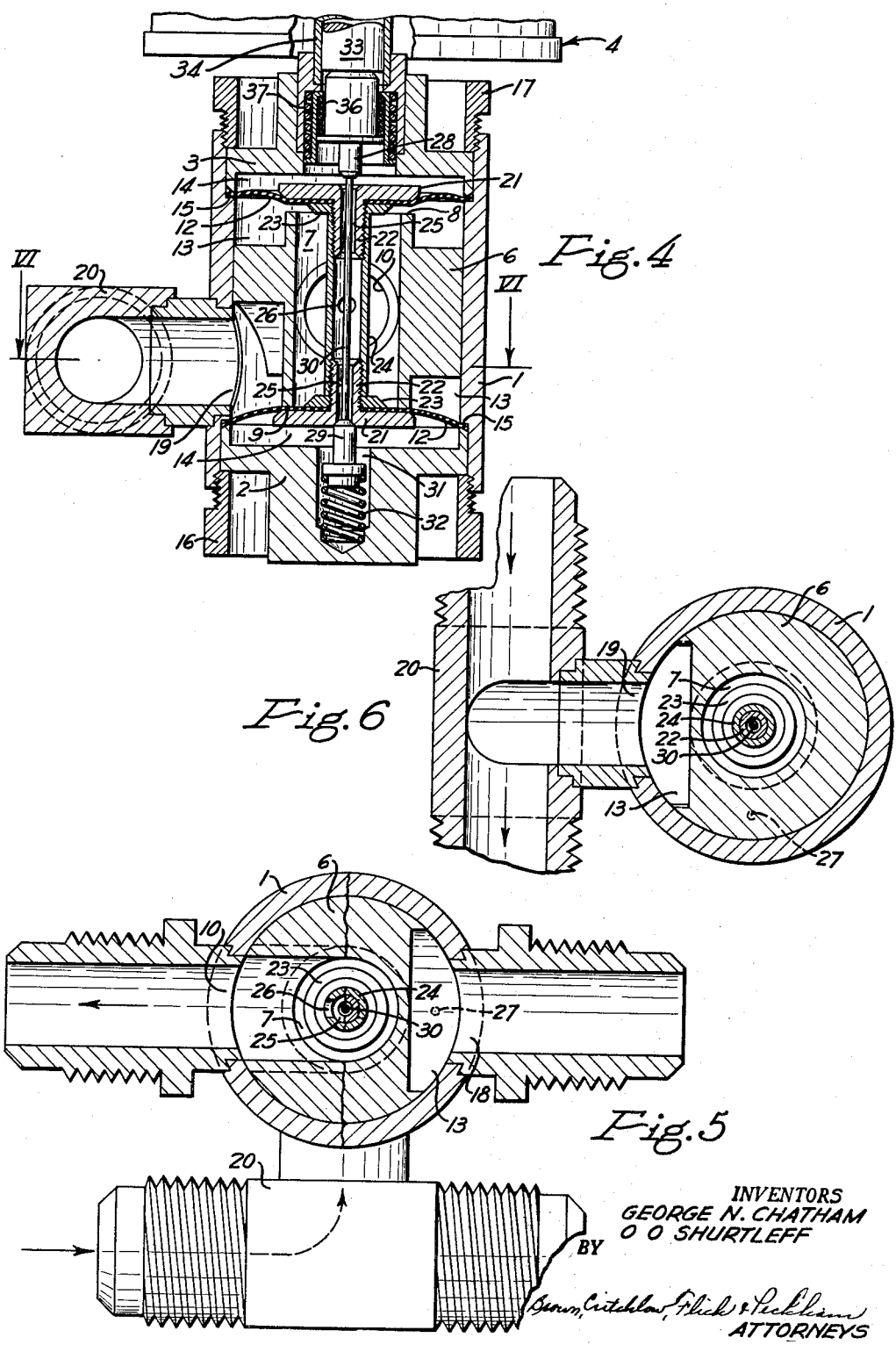

United States Patent Office 3,099,290
Patented July 30, 1963

3,099,290
DIVERTING VALVE
George N. Chatham and O O Shurtleff, Austin, Tex.,
assignors to Chatleff Controls, Inc., Austin, Tex., a
corporation of Texas
Filed Jan. 31, 1961, Ser. No. 86,060
1 Claim. (Cl. 137—607)

This invention relates to valves used for diverting fluid from one passage to another.

It is among the objects of this invention to provide a valve for directing fluid through either one of two circuits, in which the transfer from either circuit to the other is made gradually without any interruption of flow, in which the rate of movement of the valve during the transfer is controlled by the rate of fluid movement into and out of it, and which is quiet and positive in operation.

In accordance with this invention a valve housing contains a pair of spaced end chambers connected by a central passage of smaller diameter that is provided with a lateral outlet port. Each end of the passage has a valve seat in the surrounding chamber. Fluid pressure responsive means are mounted in the chambers for movement toward and away from the valve seats to close and open the ends of the passage. The pressure responsive means, which are provided with central openings, separate the chambers into inner and outer sections. The pressure responsive means are joined to the ends of tubular means between them aligned with their central openings. The tubular means open into the central passage of the housing. The valve is provided with by-passes permanently connecting each inner chamber section with the adjoining outer chamber section. The valve housing has two inlet ports, each of which opens into one of the inner chamber sections. In the outer chamber sections there are movable closure members for the central openings in the pressure responsive means. The closure members are spaced farther apart than the pressure responsive means by a rod extending loosely through the central openings and tubular means between them. Provision is made for moving the closure members axially of the tubular means to close either of the central openings in the pressure responsive means and to open the other, whereby the fluid in the valve will shift it from one circuit to the other.

Figure 7:
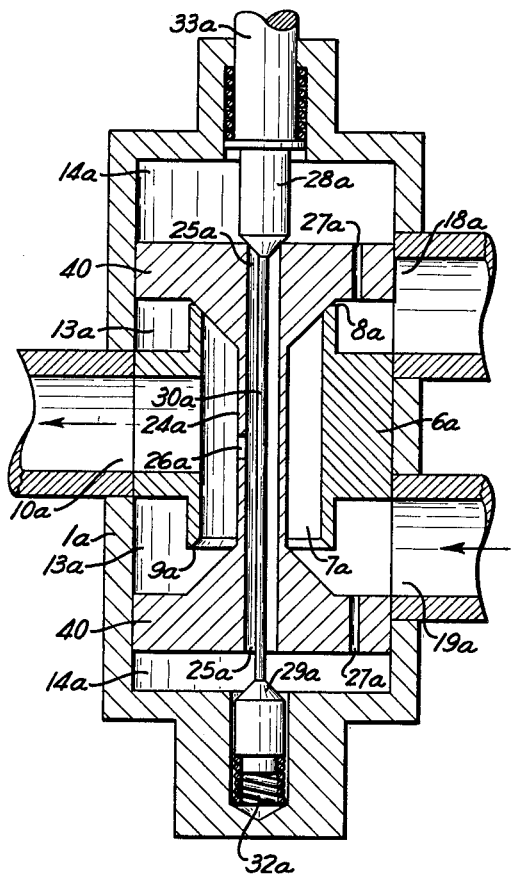
Figure 8:
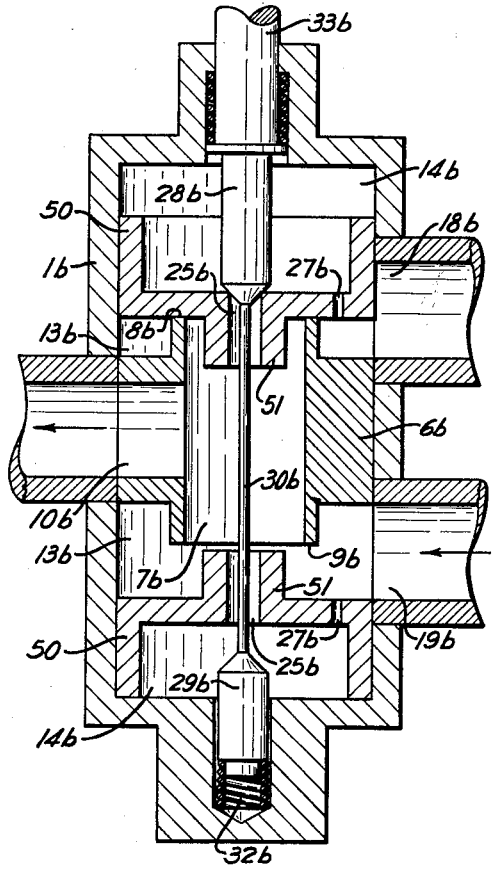

The invention is illustrated in the accompanying drawings, in which:

FIG. 1 is a plan view of our valve;
FIG. 2 is a side view;
FIG. 3 is an enlarged vertical section, taken on the line III—III of FIG. 1;
FIG. 4 is an enlarged fragmentary vertical section, taken on the line IV—IV of FIG. 1 at 90° to FIG. 3;
FIG. 5 is a horizontal section, taken on the line V—V of FIG. 3;
FIG. 6 is a horizontal section, taken on the line VI—VI of FIG. 4; and
FIGS. 7 and 8 are enlarged fragmentary vertical sections, somewhat diagrammatic, through two different modified embodiments of this invention.

Referring to FIGS. 1 to 6 of the drawings, in which the valve is shown vertical for convenience of description, a vertical cylinder 1 is closed at its lower end by a bottom cap 2, and is closed at its upper end by a top cap 3 and the lower part of a solenoid mechanism 4. The inside of the housing thus formed is separated into upper and lower end chambers by means of a central partition member 6 fitting tightly in the housing and through which extends a vertical passage 7 that connects the upper and lower chambers. The passage is considerably smaller in diameter than the chambers, and the side wall of the passage projects a short distance above and below the partition to form circular valve seats 8 and 9 spaced from the side walls of the chambers. Midway between its ends, the passage is provided with an outlet port 10 that extends outward through the partition and the cylinder.

Disposed in the upper and lower chambers of the valve housing are fluid pressure responsive means, each of which includes a flexible diaphragm 12 that separates a chamber into inner and outer sections 13 and 14. To clamp the outer edges of the diaphragms against the side wall of the cylinder, the diameter of each outer chamber section 14 is enlarged to form an outwardly facing annular shoulder 15 engaged by a diaphragm. The bottom cap 2 of the housing fits in the enlarged lower end of the cylinder and has a flange pressed up tightly against the edge of the lower diaphragm on the lower shoulder by means of a collar 16 screwed into the cylinder below the cap. The upper diaphragm is clamped in place on the upper shoulder 15 in a similar manner by a collar 17 screwed into the upper end of the cylinder above the upper cap 3.

The valve housing is provided with an inlet port 18 (FIG. 3) that opens into the upper inner chamber section 13, and with another inlet port 19 (FIG. 4) that opens into the lower inner chamber section 13. Preferably, a T-fitting 20 is connected to the lower inlet port, although the same result could be obtained by providing the lower part of the valve housing with an outlet from lower inner chamber section 13. To permit the housing to be made as short as possible, parts of partition member 6 at the inner ends of the inlet ports are cut away so that the ports can overlap that member without being obstructed by it.

The pressure responsive means also include rigid members clamped against the central portions of the diaphragms so that they can be connected and also serve as closure members for the ends of the central passage 7. Accordingly, a flat disc 21, larger than the adjacent valve seat, engages the outer surface of each diaphragm and has a central stem 22 extending through a hole in the center of the diaphragm and also through a washer 23 engaging the inner surface of the diaphragm. The inner end of stem 22 is screwed into the adjoining end of a rigid tube 24 to clamp the diaphragm and washer between the disc and tube. The tube, which is much smaller than passage 7, extends through it to the other pressure responsive means, to which it is connected in like manner. The tube is longer than the passage so that only one diaphragm at a time can engage a valve seat. The two discs 21 and their stems are provided with axial bores 25 connecting the two outer chamber sections 14 with the inside of the tube, which is provided centrally with one or more lateral outlet holes 26 opening into the surrounding passage. Each diaphragm has a by-pass hole 27 through it outside of the adjacent seat, for permanently connecting the adjoining inner and outer chambers 13 and 14 as will be explained presently. The area of the hole must be considerably less than the area of center opening 25, and should not exceed one-half the area of that opening.

In the outer chamber sections 14 there are closure members 28 and 29 for the central openings 25 through the adjacent pressure responsive means. The two closure members are spaced apart a minimum distance which is greater than the distance between the outer faces of the two discs 21, by means of a push rod 30 that extends loosely through the discs and tube 24 and is slidably mounted in at least one of the closure members. Preferably, the closure members are plungers. The lower one 29 is slidably mounted in an axial socket 31 in the bottom cap of the housing and is urged upwardly by a light coil spring 32. The upper plunger 28 is connected to a solenoid core 33 slidably mounted in a sealed tube 34 sealed in cap 3 and encircled by an electric coil 35. The core is urged toward the opposite end of the valve housing by coil springs 36 and 37 encircling the lower end of the core.

The normal position of the valve, in which solenoid coil 35 is not energized, is shown in FIGS. 3 and 5. In that position, upper plunger 28 closes the central opening 25 through the upper pressure responsive means, so the fluid pressure in upper chamber section 14 above diaphragm 12 holds the diaphragm on seat 8 because the fluid pressure is less in passage 7. At the same time, rod 30 pushes lower plunger 29 away from the central opening 25 in the lower pressure responsive means, whereby lower chamber section 14 is in communication with the inside of tube 24 and, by means of holes 26, with the lower pressure in outlet port 10. This makes it easy for tube 24 to push the lower diaphragm away from seat 9. Since the fluid pressure in lower chamber section 14 now will be less than in lower chamber section 13, the lower pressure responsive means pulls down on the upper diaphragm to aid in preventing leakage at the upper end of passage 7. At this time the fluid therefore enters one end of the T-fitting 20 and is diverted through lower inlet port 19 into lower chamber 13, and then up into central passage 7 and out through outlet port 10. The circuit from the other end of the T-fitting through elements (not shown) outside of the valve and back to inlet port 18 is shut off by the closure at seat 8.

When the solenoid coil is energized, core 33 is drawn upward to remove upper plunger 28 from central opening 25 in disc 21. Due to the sliding connection between rod 30 and at least one of the plungers, this rising of the upper plunger does not pull the lower plunger with it, which would require the solenoid to lift the main valve, but coil spring 32 below the lower plunger pushes that plunger up against the bottom disc 21 to close the lower central opening 25. With the opening of upper chamber section 14 in this manner, the pressure above the upper diaphragm is reduced. Simultaneously, the fluid pressure below the lower diaphragm is increased to move it upward to close the lower end of passage 7 and open its upper end, as shown in FIG. 4. Fluid therefore can no longer enter the valve housing through lower inlet 19 to be short-circuited through the valve, so it flows straight through the T-fitting as shown in FIG. 6 and around to upper inlet port 18, and then down through the center passage to outlet port 10.

When the coil is de-energized again, gravity, or springs 36 or 37, will cause upper plunger 28 to close the central opening through the upper disc and simultaneously unseat lower plunger 29 from lower opening 25. The valve then will reverse itself to return to the position shown in FIG. 3.

Although the valve has been described as if the solenoid mechanism were at the top, the valve will operate satisfactorily in any position. It is very compact, as all moving parts are concentric with one another.

The by-pass holes 27 through the diaphragms permit the fluid pressure in inner chamber sections 13 to be transmitted to outer chambers 14. They are large enough to permit the diaphragms to move at the desired speed, but not so large that either one would short-circuit the pressure imbalance created across a diaphragm at the moment of opening its center hole 25, because in that case the diaphragm would not move. The valve changes gradually from one position to the other without any flow interruption to cause water hammer, so quiet and positive operation are easily achieved. One circuit opens gradually at the same rate that the other is closed. Since the two diaphragms are rigidly connected by tube 24, the forces generated by fluid pressures at one end of the valve are transferred to the other end, thereby providing more reliable opening and seating without any possibility of the valve sticking in any position.

In the modification illustrated in FIG. 7, the operation of the valve is the same as that just described. Parts corresponding to those in FIG. 3 have been given the same reference numbers but followed by the letter "a." The principal difference in construction is that pistons have been substituted for the diaphragms of FIG. 3. The center tube 24a rigidly connects the pressure responsive means that divide each of the end chambers into inner and outer sections 13a and 14a. In this embodiment of the invention the pressure responsive means are pistons 40 that can seat on the end seats 8a and 9a of center passage 7a to close either end of the passage. As in the first embodiment, both inlet ports are under pressure continuously. Each piston is provided with an axial opening 25a in line with the connecting tube 24a. Also, each piston has a by-pass hole 27a through it outside the adjacent seat, although the same result could be obtained by substituting clearance between the piston and side of the housing for the by-pass hole. When the coil of the solenoid mechanism is energized or de-energized to cause plungers 28a and 29a to shift, the pistons and connecting tube will slide lengthwise of the valve housing in one direction or the other like a spool valve to open one end of the center passage and close the other end.

In the modification shown in FIG. 8, the parts that are similar to those in FIG. 3 are likewise given the same reference numbers, but in this case they are followed by the letter "b." The principal difference between this embodiment and the one shown in FIG. 7 is that the pistons 50 are not rigidly connected, but are independent of each other. Each piston, which could just as well be a diaphragm, has an axial opening 25b that connects with the outer end of a stub tube 51 that extends toward outlet port 10b. If desired, the stub tubes may take the form of the inwardly tapered portions of the pistons shown in FIG. 7. Their open inner ends are spaced apart at all times.

When solenoid core 33b is raised to unseat upper plunger 28b, the upper piston will rise because the fluid pressure above it will approach the lower pressure in passage 7b, and much of the pressure under the piston will be that of upper chamber section 13b. At the same time, spring 32b will push lower plunger 29b up to seat against the lower piston, so the fluid pressure in lower chamber section 14b will increase to that of chamber section 13b. As the pressure over part of the top of the piston is lower because of its exposure to the inside of passage 7b, the piston will rise until it engages the lower seat 9b. It will be seen, however, that neither piston helps to hold the other piston on its seat.

We claim:

A diverting valve comprising a housing containing a pair of spaced end chambers connected by a central passage of smaller diameter provided with a lateral outlet port, each end of said passage having a valve seat in the surrounding chamber, fluid pressure responsive means mounted in said chambers for movement toward and away from said seats to close and open the ends of said passage, said means separating the chambers into inner and outer sections and being provided with central openings, tubular means between said pressure responsive means and joined thereto around their central openings, said tubular means opening into said central passage, the valve being provided with by-passes permanently connecting each inner chamber section with the adjoining outer chamber section, said housing having inlet ports opening into said inner chamber sections, movable closure members in said outer chamber sections for the central openings in said pressure responsive means, a rod extending loosely through said central openings and tubular means and spacing said closure members farther apart than said pressure responsive means, at least one of said closure members being slidably mounted on the adjoining end of said rod, control means mounted at only one end of said housing and movable axially of said tubular means for moving the adjoining closure member against and retracting it from the adjacent pressure responsive means, and a spring for moving the other closure member against the adjacent pressure responsive means when said adjoining closure member is retracted, whereby said central openings are closed alternately, said other closure member always engaging said adjacent pressure responsive means while said adjoining closure member is retracted.

References Cited in the file of this patent

UNITED STATES PATENTS

| | | |
|---|---|---|
| 1,017,492 | Arthur | Feb. 13, 1912 |
| 1,377,360 | Melvin | May 10, 1921 |
| 1,388,624 | Whipple et al. | Aug. 23, 1921 |
| 2,768,789 | Frey | Oct. 30, 1956 |
| 2,882,929 | Churchill | Apr. 21, 1959 |
| 2,983,286 | Greenawalt | May 9, 1961 |